United States Patent [19]

Glasgow

[11] 4,380,229

[45] Apr. 19, 1983

[54] SOLAR RECEIVER PROTECTION MEANS AND METHOD FOR LOSS OF COOLANT FLOW

[75] Inventor: Lyle E. Glasgow, Westlake Village, Calif.

[73] Assignee: The United States of America as represented by the United States Department of Energy, Washington, D.C.

[21] Appl. No.: 209,921

[22] Filed: Nov. 24, 1980

[51] Int. Cl.$^3$ .................................................. F24J 3/02
[52] U.S. Cl. ..................................... 126/418; 126/432; 126/434; 126/437; 126/439
[58] Field of Search ............... 126/418, 432, 434, 438, 126/439, 451, 435, 437

[56] References Cited

U.S. PATENT DOCUMENTS

| | | | |
|---|---|---|---|
| 4,164,123 | 8/1979 | Smith | 126/438 X |
| 4,186,726 | 2/1980 | Spencer | 126/434 X |
| 4,244,352 | 1/1981 | Foster | 126/422 |
| 4,278,073 | 7/1981 | Canzano et al. | 126/437 |
| 4,286,579 | 9/1981 | Johnston | 126/438 |
| 4,296,729 | 10/1981 | Cooper | 126/437 X |

Primary Examiner—Samuel Scott
Assistant Examiner—Margaret A. Focarino

[57] ABSTRACT

An apparatus and method for preventing a solar receiver (12) utilizing a flowing coolant liquid for removing heat energy therefrom from overheating after a loss of coolant flow. Solar energy is directed to the solar receiver (12) by a plurality of reflectors (16) which rotate so that they direct solar energy to the receiver (12) as the earth rotates. The apparatus disclosed includes a first storage tank (30) for containing a first predetermined volume of the coolant and a first predetermined volume of gas at a first predetermined pressure. The first storage tank (30) includes an inlet and outlet through which the coolant can enter and exit. The apparatus also includes a second storage tank (34) for containing a second predetermined volume of the coolant and a second predetermined volume of the gas at a second predetermined pressure, the second storage tank (34) having an inlet through which the coolant can enter. The first and second storage tanks (30) and (34) are in fluid communication with each other through the solar receiver (12). The first and second predetermined coolant volumes, the first and second gas volumes, and the first and second predetermined pressures are chosen so that a predetermined volume of the coolant liquid at a predetermined rate profile will flow from the first storage tank (30) through the solar receiver (12) and into the second storage tank (34). Thus, in the event of a power failure so that coolant flow ceases and the solar reflectors (16) stop rotating, a flow rate maintained by the pressure differential between the first and second storage tanks (30) and (34) will be sufficient to maintain the coolant in the receiver (12) below a predetermined upper temperature until the solar reflectors (16) become defocused with respect to the solar receiver (12) due to the earth's rotation.

9 Claims, 4 Drawing Figures

SOLAR RECEIVER PROTECTION MEANS AND METHOD FOR LOSS OF COOLANT FLOW

ORIGIN OF THE INVENTION

The invention described herein resulted from Contract No. DE-AC-03-78ET-20567 between the U.S. Department of Energy and the Rockwell International Corporation.

TECHNICAL FIELD

This invention relates to solar energy collection systems, and more specifically to a protection means for a solar receiver wherein a power failure will not result in the solar receiver temperature increasing above a predetermined temperature due to loss of coolant flow through the receiver.

BACKGROUND OF THE INVENTION

In a typical solar energy system wherein a solar receiver is utilized in conjunction with a plurality of rotatable solar energy reflectors controlled so as to continuously focus solar energy onto the solar receiver, a loss of coolant to the solar receiver due to a coolant pump failure requires that the reflectors be automatically and rapidly defocused to prevent receiver melt down. However, a pump failure is frequently associated with an overall power failure which would also prevent automatic defocusing of the reflector. In that type of power failure, receiver melt down would occur. The present invention solves the above problem by providing a protection means wherein an automatic flow of sufficient coolant will occur to prevent receiver melt down until the reflectors become defocused with respect to the solar receiver due to the earth's rotation.

OBJECTS AND SUMMARY OF THE INVENTION

In a solar energy collection system having at least one solar receiver for coupling reflected solar energy to a fluid passing through the solar receiver, a rotatable reflecting means for reflecting the solar energy to the solar receiver, a pump means for causing the fluid to flow through the solar receiver, it is an object of the present invention to provide a protection means for preventing the solar receiver from overheating should the pump means become inoperative and the reflecting means also become stationary.

It is a further object of the invention to provide first and second fluid storage means at the input and output of the solar receiver, respectively, the storage means being pressurized so that in the event of a pump failure, a pressure differential between them will cause sufficient fluid to flow from the first storage means through the solar receiver and into the second storage means until the reflecting means is defocused with respect to the solar receiver due to the earth's rotation.

It is a still further object of the invention to provide a valve means at the input to the first storage means which will block liquid contained therein from flowing outwardly through the valve whenever pressure at the valve is less than pressure inside the first storage means.

These and other objects of the invention are realized by a protection means including a first storage tank for containing a first predetermined volume of a liquid and a first predetermined volume of a gas at a first predetermined pressure, the first storage tank having an inlet means and an exit means through which the liquid can enter and exit, and a second storage tank for containing a second predetermined gas at a second predetermined pressure, the second storage tank having an inlet means through which the fluid can enter. The protection means further includes a conduit means for interconnecting the first storage tank exit means, a solar receiver for transferring solar energy to the fluid as thermal energy as it flows therethrough, and the second storage tank inlet means. The first and second predetermined liquid volumes, the first and second gas volumes, and the first and second predetermined pressures are chosen so that a predetermined volume of liquid at a predetermined rate profile will flow from the first storage tank through the solar receiver and into the second storage tank for a predetermined time after liquid ceases to flow through the first storage tank inlet means.

In a specific embodiment of the present invention, a stop check valve is provided adjacent to the first storage tank inlet means so that liquid cannot flow back through the stop check valve in the event of a loss of pressure at the inlet means. A gas pressurization system is also provided with stop check valves, the pressurization system maintaining pressure in ullage volumes in both storage tanks so as to effect a predetermined pressure differential. Thus, whenever a pump failure occurs, all stop check valves close, and the pressure differential between the first storage tank and second storage tank mintains liquid flow through the solar receiver until such time as the reflectors are defocused with respect to the solar receiver due to the earth's rotation.

The novel features that are considered characteristic of this invention are set forth with particularity in the appended claims. The invention will best be understood from the following description when read in connection with the accompanying drawings.

Reference will now be made in detail to preferred embodiments of the invention, an example of which is illustrated in the accompanying drawings.

DESCRIPTION OF PREFERRED EMBODIMENTS

A detailed illustrative embodiment of the invention disclosed herein exemplifies the invention and is currently considered to be the best embodiment for such purposes. It is provided by way of illustration and not limitation of the invention. It is recognized that various modifications thereof will occur to those skilled in the art. Consequently it is intended that such modifications be interpreted to be within the scope of the appended claims which define the present invention.

As previously explained, a protection means for a solar energy collection plant is disclosed. The type of solar energy collection plant utilized for illustrative purposes includes at least one solar receiver which is located at the focal points of a plurality of solar reflectors. The solar reflectors are controlled so that they continually direct the sun's energy at the solar receiver as the earth rotates. Extremely high temperatures are thus generated which could cause extensive damage to the solar receiver if flow of a coolant liquid through the receiver should cease due to a power failure or some other type of malfunction.

The protection means disclosed includes two liquid storage tanks. The first storage tank is located adjacent to the solar receiver and receives the coolant liquid before it passes through the solar receiver. The second storage tank is located so that it collects the fluid after it passes through the solar receiver and before it is provided to a heat transfer means which could be a steam generating plant. The first tank is pressurized with a gas at a first pressure, and the second tank with a gas pressurized at a second pressure. As will be explained below, a proper choice of pressures, tank sizes and ullages will cause a flow of liquid through the solar receiver to continue and decrease at a rate in accordance with a shifting of the focal point of the solar reflectors with respect to the solar receiver as the earth rotates. This allows the solar receiver to be maintained at a substantially normal operating temperature for a predetermined time chosen to be as long as required for the energy reflected by the solar reflectors to shift away from the solar receiver.

Figure 1:
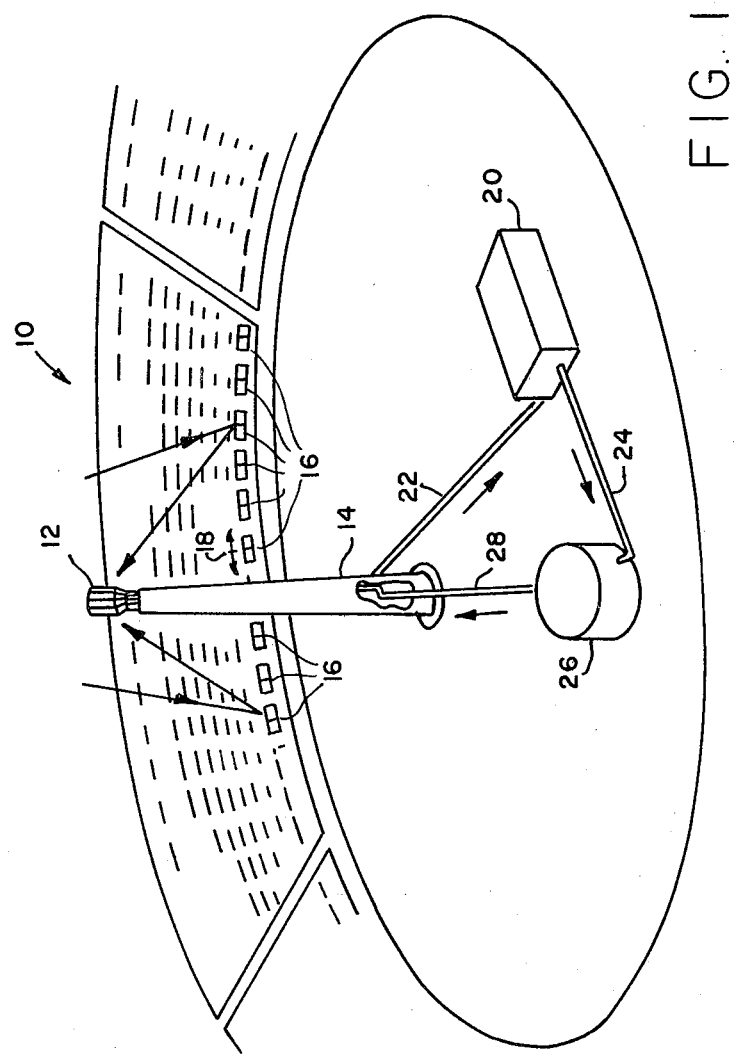
FIG. 1 is a pictorial diagram showing a solar energy collection plant of the type which could utilize the protection means of the present invention.

Referring now to FIG. 1, a solar energy collection plant 10 is shown wherein a solar receiver 12 is located atop a holding tower 14. The solar receiver 12 could include a plurality of solar receivers or solar panels located in a cylindrical configuration as shown in FIG. 1. A plurality of rotatable solar reflectors 16, which in a typical configuration would encircle the holding tower 14, are controlled so that solar energy reflected from each reflector will be directed to the solar receiver 12 as indicated by the arrow 18.

A heat transfer means, which in this embodiment is a steam generator 20, converts thermal energy contained in a coolant liquid which is heated as it passes through the solar receiver 12 into steam energy which can be utilized to drive a turbine generator or the like. As used herein, the steam generator 20 includes a generator for converting steam energy to electric energy. A first conduit 22 is provided for carrying heated liquid from the solar receiver 12 to the steam generator 20. A second conduit 24 transfers cooled liquid from the steam generator 20 to a pump 26 which in turn forces the liquid through a third conduit 28 to the solar receiver 12, thereby completing the cycle.

As noted hereinbefore, a problem with this type of system is that whenever power is interrupted, the pump 26 no longer forces the coolant liquid to flow through the conduits 22, 24, and 28. Thus the solar receiver 12 will heat up to a point where it may be severely damaged. However, the same loss of power will probably cause the solar reflectors 16 to stop rotating. This cessation of rotation will result in the focal point of the reflectors moving away from the solar receiver 12 as the earth continues to rotate. Alternatively, power to the solar reflectors 16 may be purposely interrupted to ensure cessation of rotation whenever flow into the solar receiver 12 differs from flow out of the receiver 12. The prevention means disclosed below prevents excessive heat build up in the solar receiver 12 during that period of time required for the focal points of the solar reflectors 16 to move away from the solar receiver 12.

Figure 2:
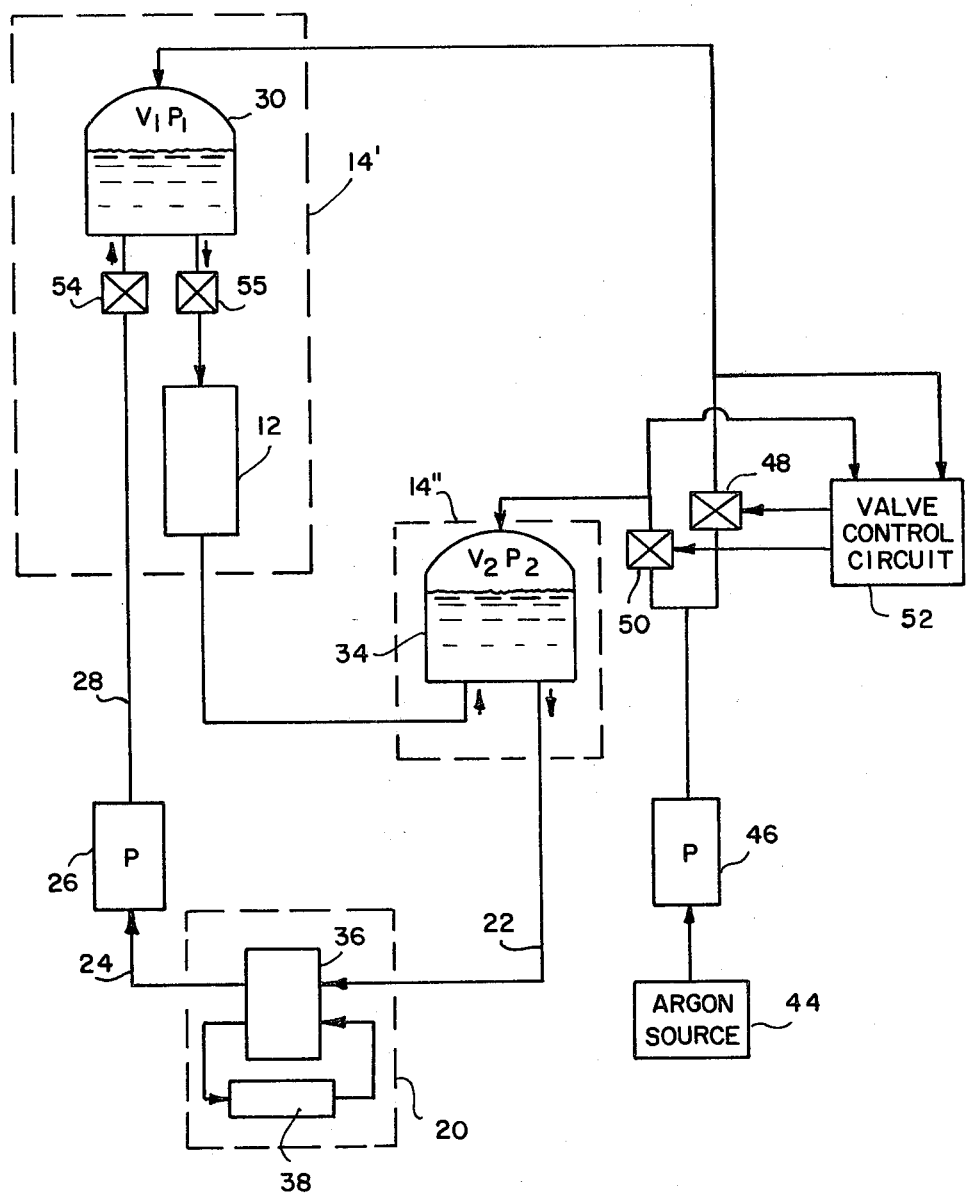
FIG. 2 is a block diagram showing the protection means provided by the invention.

Referring now to FIG. 2, a block diagram of the protection means is shown. Within an upper portion 14' of the holding tower 14 (FIG. 1) is a first storage tank 30. The coolant liquid flows through the solar receiver 12 which is located near the focal point of the solar reflectors 16 (FIG. 1). At a lower portion 14" of the holding tower is a second storage tank 34 in which heated liquid from the solar receiver 12 is stored. The steam generator 20 includes a heat transfer unit 36 where thermal energy from the heated liquid is utilized to generate steam for driving a turbine 38. In operation, relatively cool liquid from the heat transfer unit 36 is transferred by the pump 26 to the first storage tank 30 from which it passes through the solar receiver 12 to the second storage tank 34 and from there back into the heat transfer unit 36. In the specific embodiment chosen, liquid sodium is utilized as the coolant liquid and is stored in the first storage tank 30 at a temperature of approximately 288° C. The solar receiver 12 and solar reflectors 16 are chosen so that the sodium is heated to a temperature of approximately 598° C. Sodium at this temperature is stored in the second storage tank 34 prior to being provided to the steam generator 20.

A gas pressurization system is also provided, the specific gas utilized being argon. Argon is provided by an argon storage tank 44 and pressurized by a gas pump 46. Pressurized argon is provided to a first pressure reduction valve 48 and a second pressure reduction valve 50. These valves are controlled by an appropriate control circuit 52 to maintain the argon within the first storage tank 30 at a first predetermined pressure $P_1$ and in the second storage tank 34 at a second predetermined pressure $P_2$.

The first and second pressure reduction valves 48 and 50 are chosen to be of the stop check type so that whenever argon pressure from the pump 46 drops below the pressure within either of the tanks 30 or 34, gas cannot flow backwardly from the tanks through the valves 48 and 50. This ensures that in the event of a pump 46 malfunction, or a breakage in the line leading from the pump 46 to the valves 48 and 50, that gas will not escape backwardly from the storage tanks 30 and 34.

A stop check valve 54 is similarly provided between the pump 26 and the storage tank 30 so that in the event of a power failure the liquid in the tank 30 will not flow backwardly through the stop check valve 54. In the exemplary embodiment the first tank 30 is higher than the second tank 34, and the pressure within the volume $V_1$ is chosen to be greater than the pressure within the volume $V_2$. Thus, in the event of a pump 26 stoppage, the stop check valve 54 will close. The pressure $P_1$ within the volume $V_1$ is chosen to be sufficient to force liquid contained within the tank 30 through the solar receiver 12 and into the second storage tank 34. As previously explained, this pressure is chosen so that flow will occur at a rate profile and for a time sufficient to maintain the solar receiver 12 at or below a predetermined upper level limit. This time is related to the amount of solar energy versus time that is reflected by the solar reflectors 16 onto the solar receiver 12 as the earth rotates. A second valve 55 is provided so that flow through the solar receiver 12 can be controlled whenever necessary.

Although, in this embodiment, the first storage tank 30 is at an elevation higher than that of the second storage tank 34, it should be understood that the protection means of the invention is not limited to this configuration. For example, the solar receiver 12 and its associated first storage tank 30 could be located at an elevation lower than that of the second storage tank 34. Operation of the system would still be as previously described simply by a proper choosing of the pressures within the first and second storage tanks 30 and 34. Similarly, the system shown in FIGS. 1 and 2 could also incorporate a fossil heater in series with the line carrying liquid sodium between the second storage tank 34 and the steam generator 20. This fossil heater could then be utilized to heat the liquid sodium whenever insufficient solar energy is available such as on a cloudy day and during the night.

In a specific example of the protection means to be described in further detail below, six first storage tanks are chosen, the tanks having a 2.44 meter diameter and a 6.1 meter height, each tank being in series with the solar receiver 12. Similarly, six second storage tanks having the same dimensions are also utilized. However, sizing of the tanks, choosing of the argon pressure within each tank, and selection of the amount of liquid sodium to be contained in each tank are all variables which must be determined.

In operation, if the pump 26 fails due to a power failure, the stop check valve 54, and the first and second pressure reduction valves 48 and 50 immediately become configured so that liquid or gas cannot flow backwardly through them. At this time the pressure differential between liquid in the first storage tank 30 and the second storage tank 34 causes the liquid to flow through the solar receiver 12 at a flow rate determined by the initial pressure differential $(P_1-P_2)$ between the first and second ullage volume $V_1$ and $V_2$. This flow rate is chosen so that it approximately matches the decrease in solar energy reaching the solar receiver 12. Thus, the temperature of the sodium exiting the solar receiver 12 is maintained substantially constant for a predetermined time period.

Figure 3:
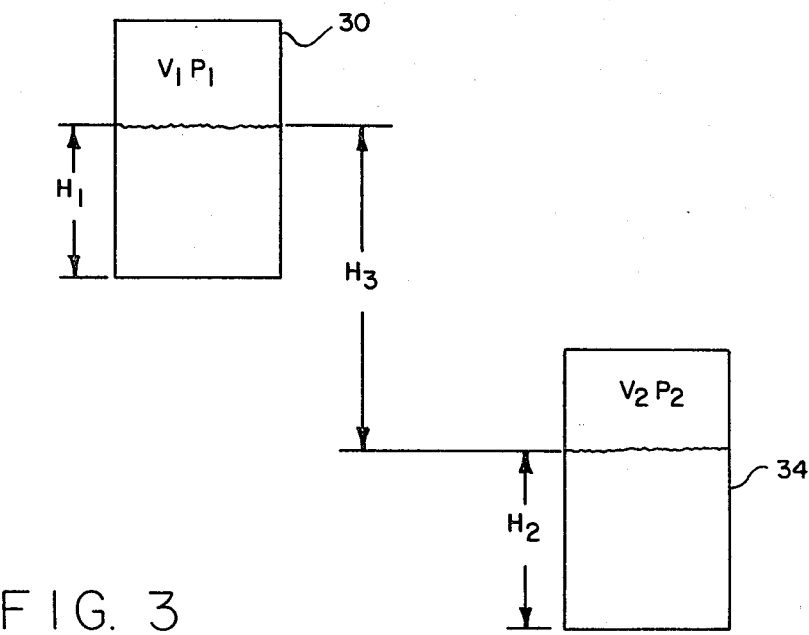
FIG. 3 is a block diagram showing the first and second storage tanks and liquid height relationships with respect to each other.

A simplified method for calculating pressure and volume relationships between the first and second storage tanks 30 and 34 will be provided in reference to FIG. 3. The heights of liquid in the first and second storage tanks 30 and 34, respectively, are the difference in liquid levels between the first and second storage tanks 30 and 34, as shown in $H_3$. Referring now to FIG. 3, assume that $P_1V_1^K$ equals $C_1$. Therefore, $$P_1 = C_1 V_1^{-K}, \quad (1)$$

$$P_2 V_2^K = C_2. \quad (2)$$

Therefore, $$P_2 = C_2 V_2^{-K}. \quad (3)$$

Assuming that $H_3=0$, the driving head $H_D=P_1-P_2$.
Substituting Equations (1) and (2) into Equation (3) and differentiating, noting that $$dV = dV_1 = -dV_2, \quad (4)$$

$$dH_D = -K[C_1 V_1^{-(K+1)} + C_2 V_2^{-(K+1)}] dV \quad (5)$$

Assuming the friction head equals $C_3Q^2$, where Q equals flow rate, differentiating the friction head, and setting the result equal to Equation (5) gives:

$$dH_D = -K[C_1 V_1^{-(K+1)} + C_2 V_2^{-(K+1)}] dV = 2C_3 Q dQ \quad (6)$$

$$\text{Thus, } \frac{dQ}{dT} = \frac{-K}{2C_3} [C_1 V_1^{-(K+1)} + C_2 V_2^{-(K+1)}] \quad (7)$$

The above equations provide a simplified method of calculating flow rates based upon pressure and volume parameters in the absence of a fluid level differential between the first and second storage tanks 30 and 34, respectively. However, detailed calculations for the flow rate are provided below.

Referring to FIG. 3, $$H_T = \frac{144}{\gamma \text{ fluid}} (P_1 - P_2) + H_3,$$

Where $H_T$ is the net head driving flow through the solar receiver and $\gamma$=fluid density.

For mass continuity $$-A_1 \frac{dH_1}{dt} = A_2 \frac{dH_2}{dt} = Q$$

where:
$A_1$=cross sectional are of first storage tank 30
$A_2$=cross sectional area of second storage tank 34
$Q$=flow rate $$dH_1 = -\frac{1}{A_1} Q \, dt$$

$$dH_3 = dH_1 - dH_2$$

$$dH_3 = \left(1 + \frac{A_1}{A_2}\right) dH_1.$$

Flow velocity, Q, through the solar receiver is given by the equations $Q=aw$ $$Q^2 = C_1 H_T,$$

where
$a$=flow area
$w = \sqrt{2gH_T}$, and
$g$=force of gravity.

$$C_1 = 2ga^2 = \frac{Q^2}{H_T}$$

$$2Q dQ = C_1 dH_T$$

$$dH_T = \frac{2Q}{C_1} dQ$$

However, $$H_T = C_2(P_1 - P_2) + H_3$$

$$\text{where } C_2 = \frac{144}{\gamma \text{ fluid}}$$

$$dH_T = C_2 d(P_1 - P_2) + dH_3$$

$$\frac{2Q dQ}{C_1} = C_2 d(P_1 - P_2) + \left(1 + \frac{A_1}{A_2}\right) dH_1$$

-continued $$\frac{2QdQ}{C_1} = C_2 d(P_1 - P_2) + \left(1 + \frac{A_1}{A_2}\right)\left(-\frac{1}{A_1}Qdt\right).$$

With the storage tanks 30 and 34 not vented, $P_1$ and $P_2$ are functions of the initial pressure values and the change in ullage volumes $V_1$ and $V_2$.

Assuming an adiabatic expansion in the first storage tank 30 and an adiabatic compression in the second tank 34, $$PV^K = \text{constant}$$

where K equals a ratio of the specific heats.
Differentiating $$\frac{dP_1}{dV_1} = -C_3 K V_1^{-(K+1)}, \text{ where } C_3 = (P_1 V_1^K)_0$$

$$\frac{dP_2}{dV_2} = -C_4 K V_2^{-(K+1)}, \text{ where } C_4 = (P_2 V_2^K)_0$$

but, $$V_1 = V_{10} - A_1 dH_1$$

$$V_2 = V_{20} - A_2 dH_2$$

and $$A_1 dH_1 = -Qdt$$

$$A_2 dH_2 = Qdt$$

Substituting $$d(P_1 - P_2) = -C_3 K V_1^{-(K+1)} Qdt - C_4 K V_2^{-(K+1)} Qdt$$

$$\frac{C_2}{Q} d(P_1 - P_2) = -C_2 K [C_3 V_1^{-(K+1)} + C_4 V_2^{-(K+1)}] dt$$

Substituting for $(C_2/Q)d(P_1-P_2)$, Equation (A) becomes $$dQ = -\frac{C_1}{2}\left[C_2 K \{C_3 V_1^{-(K+1)} + C_4 V_2^{-(K+1)}\} + \frac{A_1 + A_2}{A_1 A_2}\right] dt. \quad (B)$$

With $A_1 = A_2 =$ constant with tank height (that is, cylindrical tanks as opposed to shaped tanks), Equation (B) can be integrated as follows:

$$\Delta Q = -\frac{C_1 C_2 C_3}{2} K(\overline{V_1})^{-(K+1)} \Delta t - \quad (C)$$

$$\frac{C_1 C_2 C_4}{2}(\overline{V_2})^{-(K+1)} \Delta t - \frac{C_1}{A_1}\Delta t$$

Note that:

$$V_1 = V_1(\text{initial}) + \int Qdt = V_{10} + \int \Delta V$$

$$V_2 = V_2(\text{initial}) + \int Qdt = V_{20} - \int \Delta V$$

and $$\overline{V_1} = (V_{1(t)} + V_{1(t+\Delta t)}) \div 2 \text{ (for any } t\text{)}$$

$$\overline{V_2} = (V_{2(t)} + V_{2(t+\Delta t)}) \div 2 \text{ (for any } t\text{)}$$

Thus:

$$Q = Q_0 - \int dQ = Q_0 - \Sigma \Delta Q.$$

Figure 4:
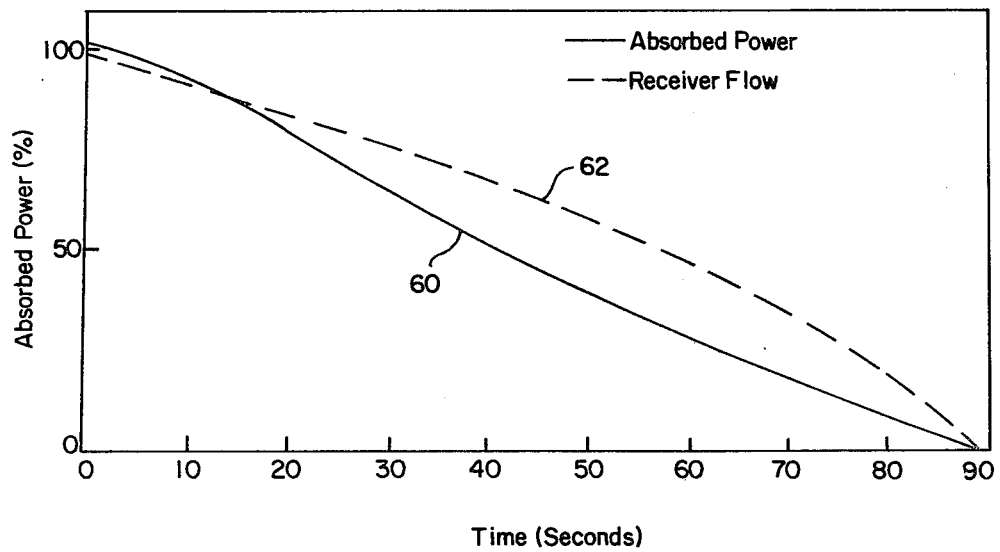
FIG. 4 is a graph showing the relationship of solar power and receiver flow with respect to time which is achievable with one configuration of the liquid storage tanks.

Referring now to FIG. 4, sizing of the various systems parameters utilizing the equations derived above can be effected so that for an absorbed power curve as shown at 60 a receiver flow as a percent of full flow as shown at 62 can be effected, thus ensuring that no damage to the solar receiver 12 will occur as a result of a pump 26 stoppage. As can be seen, complete defocusing of the energy from the solar reflectors 16 with respect to the solar receiver 12 will occur in about 90 seconds, and the various system parameters should be chosen accordingly.

Table 1 below shows operation of a system under various assumed initial conditions. It is emphasized that these are theoretically derived numbers and may differ from actual sizing numbers utilized in an operating system.

In an exemplary system, the first tank 30 actually comprises six individual tanks as above described, and typically has a liquid sodium level change of about 5.6 feet for each of the tanks after loss of pump power. The tanks normally operate between 60 and 80 percent ullage. A typical stop check valve 54 is described in Clinch River Breeder Reactor Plant Equipment Specification, subtitled Sodium Check Valves (CRBRP) Specification No. NO99NV812017, Rev. 5, dated May 15, 1979. A typical valve for the gas pressurization system is described in Clinch River Breeder Reactor Plant Equipment Specification, subtitled Valve, Globe, Check, Needle, ASME Section 3, Class 2 and 3, One Quarter to Six Inches, Specification No. NO99NV821002.

TABLE 1

| | 1 | 2 | 3 | 4 |
|---|---|---|---|---|
| $H_T$ (feet) | 101.9 | 99.2 | 93.3 | 88.6 |
| $H_3$ (feet) | +6.7 | +4.0 | −2.0 | −6.7 |
| $C_1 = Q_0^2/H_D$ | 0.1 | 0.1 | 0.1 | 0.1 |
| $C_2 = 144/\gamma$ | 2.7 | 2.7 | 2.7 | 2.7 |
| $C_3 = (P_1 V_1^K)_0$ | $8.3 \times 10^5$ | $16.1 \times 10^5$ | $16.1 \times 10^5$ | $2.6 \times 10^6$ |
| $C_4 = (P_2 V_2^K)_0$ | $7.9 \times 10^5$ | $8.5 \times 10^5$ | $3.3 \times 10^5$ | $2.5 \times 10^5$ |
| $Q_0 =$ (ft$^3$/sec) | 3.3 | 3.3 | 3.3 | 3.3 |
| $Q_0 =$ gpm/ with six 8 × 20 cylindrical tanks | 1500 | 1500 | 1500 | 1500 |
| $V_{10}$ | 335.3 | 500 | 500 | 670.5 |
| $V_{20}$ | 670.5 | 700 | 400 | 335.3 |
| K | 1.7 | 1.7 | 1.7 | 1.7 |
| $P_{10}$ (psia) | 50 | 50 | 50 | 50 |
| $P_{20}$ (psia) | 15 | 15 | 15 | 15 |

What is claimed is:

1. A protection means for a solar receiver adapted to transfer solar energy as thermal energy to a liquid passing therethrough, said protection means comprising:
   a first storage tank for containing a first predetermined volume of said liquid and a first predetermined volume of a gas at a first predetermined pressure, said first storage tank having an inlet means and an exit means through which said liquid can enter and exit;

a second storage tank for containing a second predetermined volume of said liquid and a second predetermined volume of a gas at a second predetermined pressure, said second storage tank having an inlet means through which said liquid can enter;

conduit means interconnecting said first storage tank exit means, said solar receiver, and said second storage tank inlet means whereby in the absence of liquid passing through said first storage tank inlet means, said first and second predetermined liquid volumes, said first and second predetermined gas volumes, and said first and second predetermined pressures are chosen so that a predetermined volume of fluid will flow at a predetermined flow rate profile from said first storage tank through said solar receiver and into said second storage tank; and wherein a pump means is in fluid communication with said first storage tank inlet means via a supply conduit, said protection means further comprising a first stop check valve means in series with said supply conduit for blocking the flow of fluid through said supply conduit when liquid pressure within said first storage tank is greater than liquid pressure within said supply conduit portion between said pump and said first stop check valve means, and wherein said first storage tank comprises a gas inlet means and said second storage tank comprises a gas inlet means, said protection means further comprising:

a gas pressurization system for providing gas at said first predetermined pressure to said first storage tank gas inlet means via a first gas supply conduit, and gas at said second predetermined pressure to said second storage tank gas inlet means via a second gas supply conduit; and second stop check valve means located in said first gas supply conduit for preventing gas from flowing from said first storage tank through said first gas supply conduit.

2. The protection means of claim 1 wherein said protection means further comprises third stop check valve means for preventing gas from flowing from said second storage tank through said second gas supply conduit.

3. In a solar energy collection system having at least one solar receiver for coupling reflected solar energy to a fluid passing through said solar receiver, a reflecting means for reflecting said solar energy to said solar receiver, a heat transfer means for removing thermal energy from said fluid after having passed through said solar receiver, a conduit means for transporting said fluid between said solar receiver, said heat transfer means, and back to said solar receiver, and a pump means for causing said fluid to flow through said conduit means, a protection means for preventing said solar receiver from overheating said fluid should said pump means become inoperative comprising:

a first fluid storage means in fluid communication with said conduit means for storing a portion of said fluid prior to its passing through said solar receiver;

a second fluid storage means in fluid communication with said conduit means for storing a portion of said fluid subsequent to its passing through said solar receiver; and means for maintaining a pressure differential between fluid stored in said first storage means and said second storage means whereby fluid will flow from said first storage means, through said solar receiver, and into said second storage means for a predetermined time after said pump means become inoperative.

4. The protection means of claim 3 further comprising stop check valve means in series with said conduit means interconnecting said heat transfer means and said solar receiver.

5. The protection means of claim 4 wherein said stop check valve means is located in series with a portion of said conduit means adjacent to said first storage means, said stop check valve means obstructing the flow of fluid through said portion of said conduit means when the pressure therein is less than said fluid pressure within said first storage means.

6. The protection means of claim 4 wherein said fluid is a liquid, said first storage means comprising a first gas inlet means, said second storage means comprising a second gas inlet means, and said means for maintaining comprises a gas supply means in communication with said first and second gas inlets for maintaining said pressure differential between said liquid in said first and second storage means.

7. The protection means of claim 6 wherein:

said first storage means comprises a first fluid storage tank having a first predetermined volume for containing a first predetermined volume of said liquid and a first predetermined volume of said gas at a first predetermined pressure; and said second storage means comprises a second fluid storage tank having a second predetermined volume for containing a second predetermined volume of said liquid and a second predetermined volume of said gas at a second predetermined pressure, said first and second predetermined volumes of said liquid, said first and second predetermined volumes of said gas, and said first and second predetermined pressures being chosen so that said liquid will flow from said first tank to said second tank for said predetermined time.

8. The protection means of claim 7 wherein said liquid comprises liquid sodium.

9. The protection means of claim 8 wherein said gas comprises argon.

* * * * *